US006761757B2

(12) United States Patent
Welker

(10) Patent No.: US 6,761,757 B2
(45) Date of Patent: Jul. 13, 2004

(54) INSTRUMENT PROBE WITH VALVE AND SEPARATOR

(75) Inventor: Brian H. Welker, Sugar Land, TX (US)

(73) Assignee: Welker Engineering Company, Sugar Land, TX (US)

( * ) Notice: Subject to any disclaimer, the term of this patent is extended or adjusted under 35 U.S.C. 154(b) by 0 days.

(21) Appl. No.: 10/281,653

(22) Filed: Oct. 28, 2002

(65) Prior Publication Data

US 2004/0079236 A1 Apr. 29, 2004

(51) Int. Cl.[7] .............................. B01D 39/00; G01N 1/22
(52) U.S. Cl. ...................... 96/413; 55/428; 73/31.07; 73/863.21
(58) Field of Search ......................... 96/108, 147, 413; 55/418, 428; 73/23.2, 31.07, 863.21, 863.23, 863.41, 863.61, 863.82

(56) References Cited

U.S. PATENT DOCUMENTS

| 3,794,909 A | * | 2/1974 | Smith .......................... 324/464 |
| 3,892,549 A | * | 7/1975 | Lyshkow ................... 73/863.12 |
| 5,131,260 A | * | 7/1992 | Brand et al. .................. 73/23.2 |
| 6,042,634 A | * | 3/2000 | Van Tassel et al. ............. 95/14 |
| 6,357,304 B1 | * | 3/2002 | Mayeaux .................. 73/863.23 |
| 6,444,001 B1 | * | 9/2002 | Sheffield ...................... 55/342 |
| 6,550,347 B2 | * | 4/2003 | Bradley .................... 73/863.21 |

OTHER PUBLICATIONS

*Welker Composite Gas Sampler*; Welker Engineering Company Product Distribution Catalog; 2001; Sugar Land, Texas, US.
*Welker Probe Regulators*; Welker Engineering Company Product Distribution Catalog; 2001; Sugar Land, Texas, US.
*WelkerFilters and Filter Dryers*; Welker Engineering Company Product Distribution Catalog; 2001; Sugar Land, Texas, US.

* cited by examiner

*Primary Examiner*—Frank M. Lawrence
(74) *Attorney, Agent, or Firm*—Blackwell Sanders Peper Martin LLP

(57) ABSTRACT

A probe is provided that combines in one housing a pressure regulator and filter/dryer element. The probe may be connected to a conduit for the transfer of a fluid sample, such as natural gas, from the conduit to provide separation of the fluid such that a gaseous component may be then subsequently transferred to an instrument or the like. If liquid is separated it may be returned to the conduit via a return line.

8 Claims, 4 Drawing Sheets

INSTRUMENT PROBE WITH VALVE AND SEPARATOR

BACKGROUND OF INVENTION

The present invention relates to an instrument feed stream processing device, e.g., an instrument probe that is used to separate certain components of a fluid and control the pressure of the fluid within the device and downstream instruments.

In the transport of fluids such as hydrocarbon gas, for example, natural gas, it is desirable to sample the gas to determine its properties. Such sampling can include the measurement of the Btu value of the gas. Even though natural gas is referred to as a gas, it oftentimes includes liquids and particulate matter. In order to ensure proper operation of some instruments, a pressure regulator and a filter/dryer are interposed in the flow path between the source of gas, e.g., a natural gas pipeline and the instrument. The pressure regulator and the filter dryer are separate units joined together by couplings and then coupled between the instrument and the conduit. Although effective in controlling pressure and eliminating deleterious material, there are a large number of joints as a result of such an arrangement of components with each joint providing a potential leakage source.

In addition to additional potential leak sources, each component is separately made usually from expensive materials, such as, stainless steel and aluminum alloys, increasing the cost of the total system. Separate units also utilize a large number of parts and/or assemblies.

An example of filter dryers include F-4 and F-23 from Welker Engineering, Co. of Sugar Land, Tex. Examples of pressure regulators are IR-4 and IRD-4SS also from Welker Engineering.

The deleterious materials, as discussed above, can include both liquid components and particulate matter. A liquid component could be detrimental, for example, if the instrument or instrument package includes a gas chromatograph. Liquid entering a gas chromatograph negatively affects its ability to perform an analysis and prevents the instrument from properly operating. It is thus desirable to separate liquid components from the natural gas and preferably exhaust those from the filter/dryer to prevent excessive accumulation. Also, particulate matter can negatively affect operation of an instrument by plugging small pores or flow channels. Thus, it is also desirable to preclude particulate matter of at least a certain size from entering the instrument. The filters to accomplish particulate separation are well known in the art and examples are identified above. A filter for particulate matter generally accumulates the particulate material on the filter element or within the filter media The filter media is replaced or cleaned from time to time in order to ensure proper operation of the filter device and hence the downstream instrument.

The pressure in some natural gas pipelines can be very high, as high as 5,000 psi although typically the pressure in a pipeline is in the range of between about 300 psi and about 1200 psi gage pressure. It is desirable to reduce this pressure to a pressure in the range of between about 10 psi and about 50 psi prior to a sample entering the instrument and filter/dryer in order to protect both units and to permit the units to be constructed of elements that do not need to sustain the forces from high pressure.

As discussed, although there are commercially available devices to effect both pressure regulation and filtration/drying, there is a need for an improved device to effect both pressure regulation and filtering/drying.

SUMMARY OF INVENTION

The present invention involves the provision of a device for use in gathering and processing fluid samples from a conduit. The device includes a separator combined with a pressure regulator in a common housing. The housing has a body and a cap that are selectively separable. A coupler is provided for attaching the device to the conduit for the extraction of a sample therefrom and subsequent transmission to an instrument for evaluation. The housing includes a flow passage that includes an interior chamber in which is mounted a separator device operable to separate a gaseous component of the natural gas from other components of the natural gas. The separator device is positioned flow wise between an inlet and a first outlet that is adapted for connection to an instrument. A second outlet can be provided for the discharge of a separated liquid component from the housing. A valve is mounted to the housing and is positioned in the flow passage, flow wise between the inlet to the housing and the outlet to the instrument. The valve is operable to selectively prevent and permit flow of fluid to the outlet to the instrument from the inlet and is automatically opened and closed in response to pressure in a portion of the housing. The separator device can be of a replaceable or cleanable type and removable from the housing.

DETAILED DESCRIPTION OF THE DRAWINGS

Like numbers throughout the various Figures designate like or similar parts.

DETAILED DESCRIPTION

Figure 1:
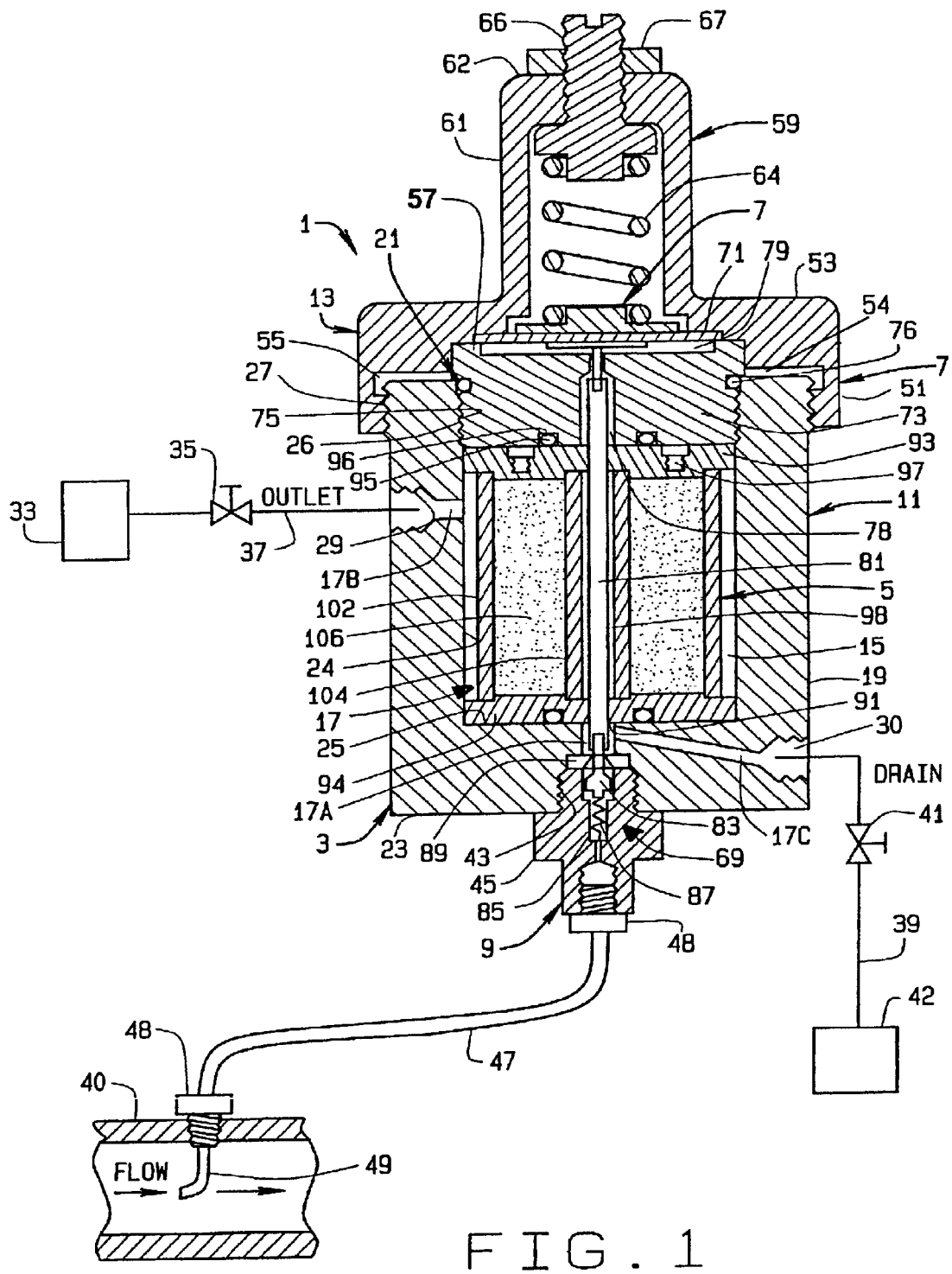
FIG. 1 is a sectional view of a fluid stream processing device connected to a source conduit by a coupling conduit.

The present invention involves a fluid stream processing device or probe designated generally 1 (which is shown in two forms in FIG. 1 and FIG. 2), which comprises a housing, designated generally 3, that contains a separator device, designated generally 5, a pressure regulator, designated generally 7, and means, designated generally 9, for attaching the device 1 to the a conduit. The housing 3 includes a body designated generally 11 and a cap designated generally 13 removably mounted on the body. The body 11 is in the form of a hollow cup with an interior chamber 15, that forms part of flow passage, designated generally 17, that is branched. The body 11 has a generally round transverse cross-section and a side wall 19 with an upper open end 21. The body 11 also includes a bottom wall 23. The chamber 15 is defined by an interior side wall surface 24 and an interior bottom wall surface 25. The upper portion of the interior and the exterior of the side wall 19 may be internally and externally threaded as at 26 and 27, respectively, for a purpose later described. The flow passage 17 includes a branch 17A through the bottom wall and that opens into the chamber 15 which chamber is also part of the flow passage. A first outlet passage branch 17B includes an outlet port 29 through the side wall 19 for feeding fluid to a sampling device such as an instrument sampling cylinder or the like. The passage 17 also includes a second outlet branch 17C that includes a second outlet port 30. The branch 17C as shown, opens into the branch 17A and provides at the branch 17A both an inlet for the intake of fluid and for discharge of liquid separated from the fluid to be exhausted through the outlet port 30. Both of the outlet ports 29, 30 are threaded to accept couplers (not shown) as are known in the art. The outlet port 29 is connected in flow communication to an instrument shown schematically as 33. A shutoff valve 35 may be provided in the connecting conduit 37, connecting the outlet port 29 to the instrument 33. The outlet port 30 can be connected for exhaust of the separated liquid by a conduit shown schematically as 39 to atmosphere or a collection device 42. A valve 41 may be interposed in the conduit 39 to regulate flow of exhausted liquid with the valve 41 not only being capable of controlling flow, but also terminating flow of liquid to the atmosphere or collection device 42. The branch 17A includes an intake port 43 that is adapted for the receipt of a coupler 45. The coupler 45 is seen in FIG. 1 is connected to a source conduit 40 via a conduit 47 that is suitably attached to the coupler 45 and the conduit 40 as by fittings 48. The conduit 47 includes an intake member 49 that is shown as a single type intake, however it is to be understood that any form of intake member 49 may be utilized such as a pitot tube type intake.

The housing 3 includes the cap 13. The cap 13 has a depending flange 51 that is internally threaded for mutual threaded engagement with the externally threaded section 27 of the body 11 for removably securing the cap 13 to the body 11. The flange 51 is an integral part with and depends from cover portion 53. The cover portion 53 has an interior wall 54 that in combination with the interior of the flange 51 forms a recess 55 for the receipt of an upper portion of the side wall 19 therein when the cap 13 and body 11 are secured together. The cover 53 has an internal pocket 57 therein for a purpose later described. The cap 13 forms part of the housing 3 for the pressure regulator 7 and includes a hollow and preferably integral shroud designated generally 59 comprising a side wall 61 and an end wall 62.

The pressure regulator 7 is preferably spring and pressure operated. In the illustrated structure, the pressure regulator 7 includes a compression spring 64 mounted in the interior of the shroud 59 and has one end in engagement with an adjuster 66 that is in threaded engagement with the end wall 62 and is selectively longitudinally movable in a direction along the longitudinal axis of the compression spring 64. The adjuster 66 may be utilized to selectively adjust the amount of preload force in the compression spring 64 which will allow for adjustment of the pressure needed to open and close a valve assembly designated generally 69 and described below. The adjuster 66 may be secured in any desired position, as for example with a lock nut 67. A diaphragm 71 is provided to seal the interior of the shroud 59 from the flow passage 17 and is flexible to allow operation of the valve assembly 69 as is known for spring actuated pressure regulators. The diaphragm 71 is captured between a portion of the cover 53 and a retainer 73. The retainer 73 has a portion thereof positioned within the pocket 57.

The retainer 73 has a threaded external side wall 75 that is in mutual threaded engagement with the internally threaded portion 26 of the side wall 19. A seal 76, such as an o-ring, seals the retainer 73 to the side wall 19 adjacent the upper end of the side wall to prevent leakage between the cap 13 and the body 11. The retainer 73 has a passage in the form of a through bore 78 providing for flow through the retainer into a chamber 79, which is on one side of the diaphragm 71 and opposite to the side of the spring 64 is on. The pressure of the fluid contained within the chamber 79 applies a force, via the diaphragm 71, to the spring directed opposite to that of that from the pre-load force applied by the spring 64. An actuator rod 81 engages the diaphragm 71 and extends through the bore 78 to the valve assembly 69.

The valve assembly 69 for convenience of manufacturing has a portion thereof mounted in the coupler 45 and a portion mounted in the body 11. As shown, the valve assembly 69 includes a valve element 83, movably mounted in a recess 85. A resilient member 87, such as a coil spring, biases the valve element 83 to a closed position in seating engagement with a valve seat 89, which is preferably removably mounted in a pocket 91 in the body 11. Preferably, the valve seat 89 is removably mounted for ease of repair and replacement. The valve element 83 and valve seat 89 have interchangeable tapered (truncated cone shaped) seating surfaces, which when in engagement seal the branch 17A and hence the flow passage 17 from receiving fluid from the conduit 40. Preferably, the valve element 83 is attached to an end of the actuator rod 81 and is movable therewith under the influence of either the diaphragm 71 or spring 64, depending on whether it is moving from an open position to a closed position or from a closed position to an open position. The spring 64 moves the valve element 83 to an open position while the diaphragm 71 and the spring 87 operate to effect movement of the valve element 83 to a closed position. Adjustment of the pressure needed to move the valve element 83 to a closed position is adjustable via the pre-load force in the spring 64. Also, when the valve element 83 is in a closed position, it will seal the passage branch 17C from the source conduit 40 allowing drainage of liquid from housing 3.

The probe device 1 includes a separator designated generally 5. The separator 5 is constructed to be interposed, flow wise, between the intake port 43 and the instrument outlet port 29, it is constructed to remove liquid and/or particulate matter from the incoming fluid prior to exiting through the outlet port 29. It is also constructed to permit, if liquid is separated from the incoming fluid, the discharge of liquid through the outlet port 30. As shown, the separator 5 is in the form of a cartridge having top and bottom walls 93, 94 respectively. The top wall 93 is to the retainer 73 via a seal member 95, such as an o-ring contained within a groove 96, preferably in the retainer 73. Means may also be provided in the top wall 93 to facilitate the removal of the separator 5 from the body 11. As shown, threaded holes 97, in which a puller, such as threaded rods or bolts may be removably inserted for extracting the separator 5 from the body 11. The bottom wall 94 rests on the bottom wall 25 and is sealed thereto radially outwardly from the actuator rod 81, as for example with a seal 99, such as an o-ring, retained within a groove 100. The seals 95, 99 prevent fluid coming in the intake port 43 from flowing into the chamber 15, except through a separating portion of the separator 5. The separator 5 has a through bore 98. A pair of tubular walls 102, 104 extend between and are secured to the walls 93, 94 forming an annular cavity 106 therebetween. The walls 102, 104 are made of a porous material, as for example linear polyethylene, which may be used to separate liquid from the incoming fluid, allowing it to drain through the bore 98 and through the bottom wall 94 into the passage branch 17C for discharge through outlet port 30. The material of the walls 102, 104 may also be used to separate particulate matter from the incoming fluid prior to discharge into the outlet port 29. The cavity 106 may, as an option, contain a desiccant material to remove liquid from the incoming fluid, in which event the outlet port 30 may not be necessary for drainage of liquid. The cavity 106, as another alternative, may have a filter element therein to filter out particulate material while the wall 104 may be of a material, such as a porous Teflon® membrane, that can be used to separate liquid from the incoming fluid for discharge through the outlet port 30. Additionally, the separator 5 may be in the form of a diaphragm extending across the chamber 15 and interposed flow wise between the inlet port 43 and the outlet port 29. It would be suitably sealed to the rod 81 passing therethrough. Such a membrane can be porous, as is known in the art, to separate the liquid from the incoming fluid and also act as a particulate matter filter.

Figure 2:
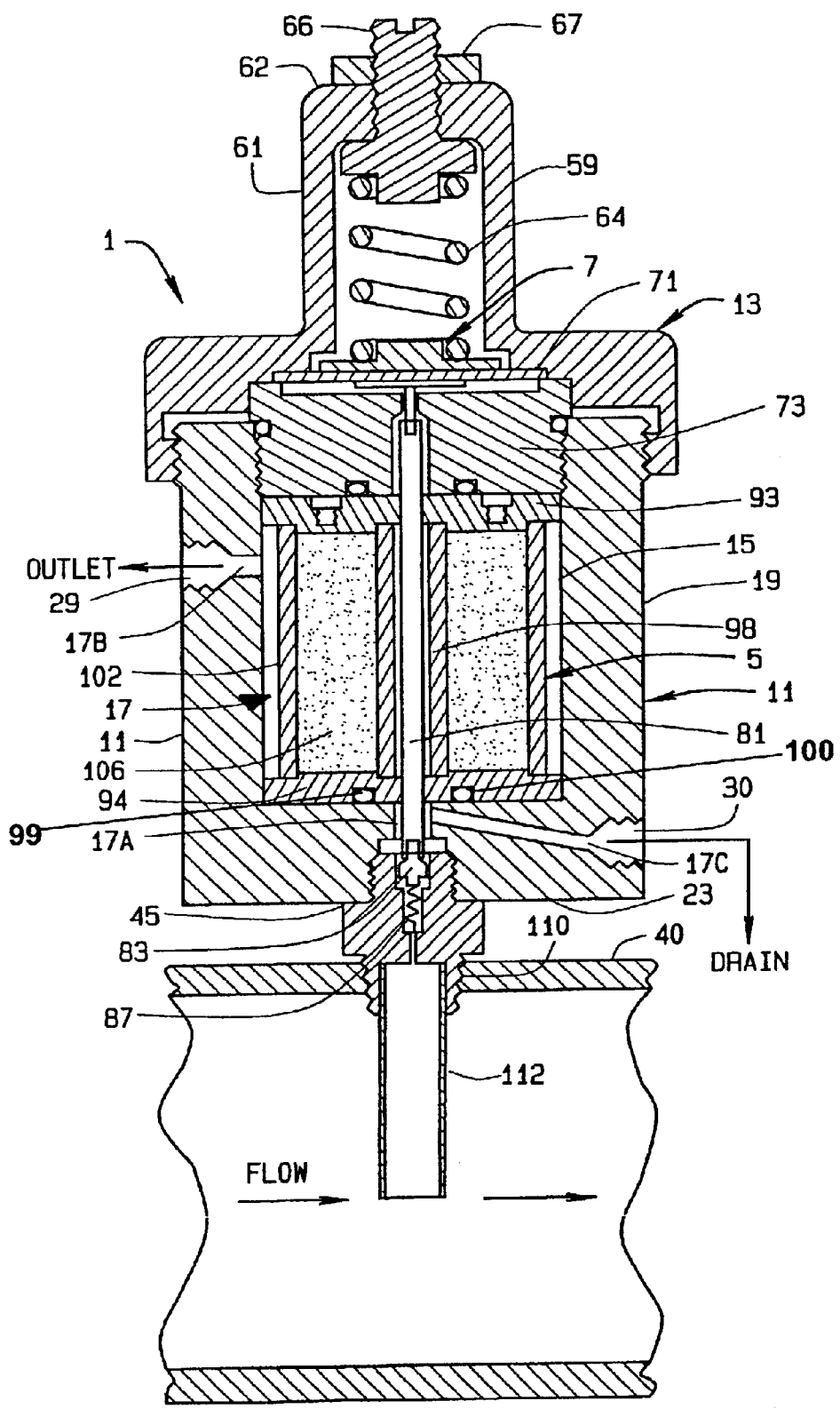
FIG. 2 is a sectional view of a processing device similar to that of a FIG. 1, but is connected directly to the source conduit by a coupler.

FIG. 2 illustrates a device similar to that shown and described to the device of FIG. 1, but the probe device 1 is attached directly to the conduit via the coupler 45, preferably through mutual threaded engagement as at 110. Additionally, an intake 112 is secured to the coupler 45 and extends into the interior of the conduit 40.

Figure 3:
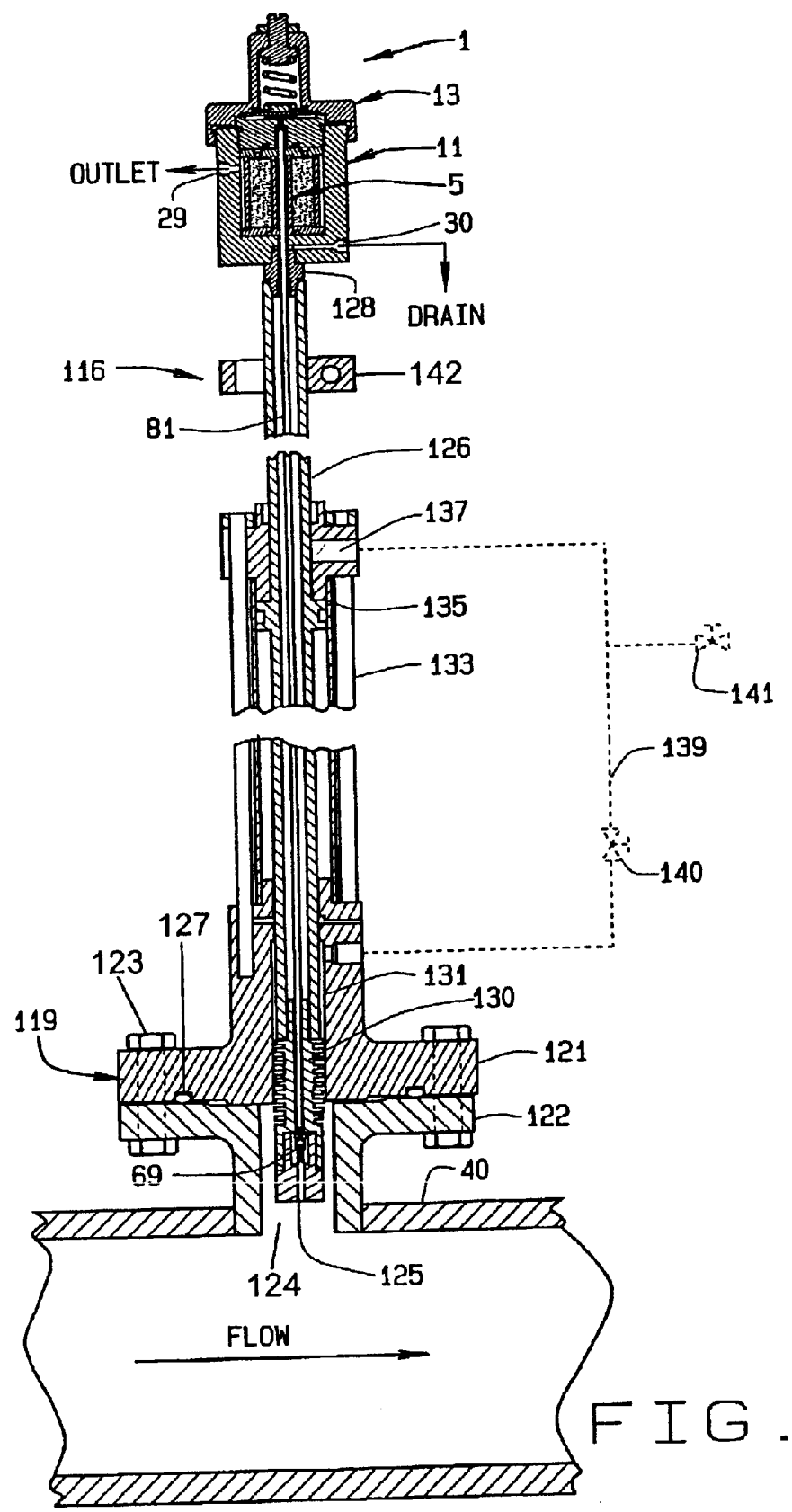
FIG. 3 is a sectional view of a processing device in combination with an automatic insertion device which is operable to move an intake into and out of the flow stream in the conduit. The end of the intake is shown in a retracted position.
Figure 4:
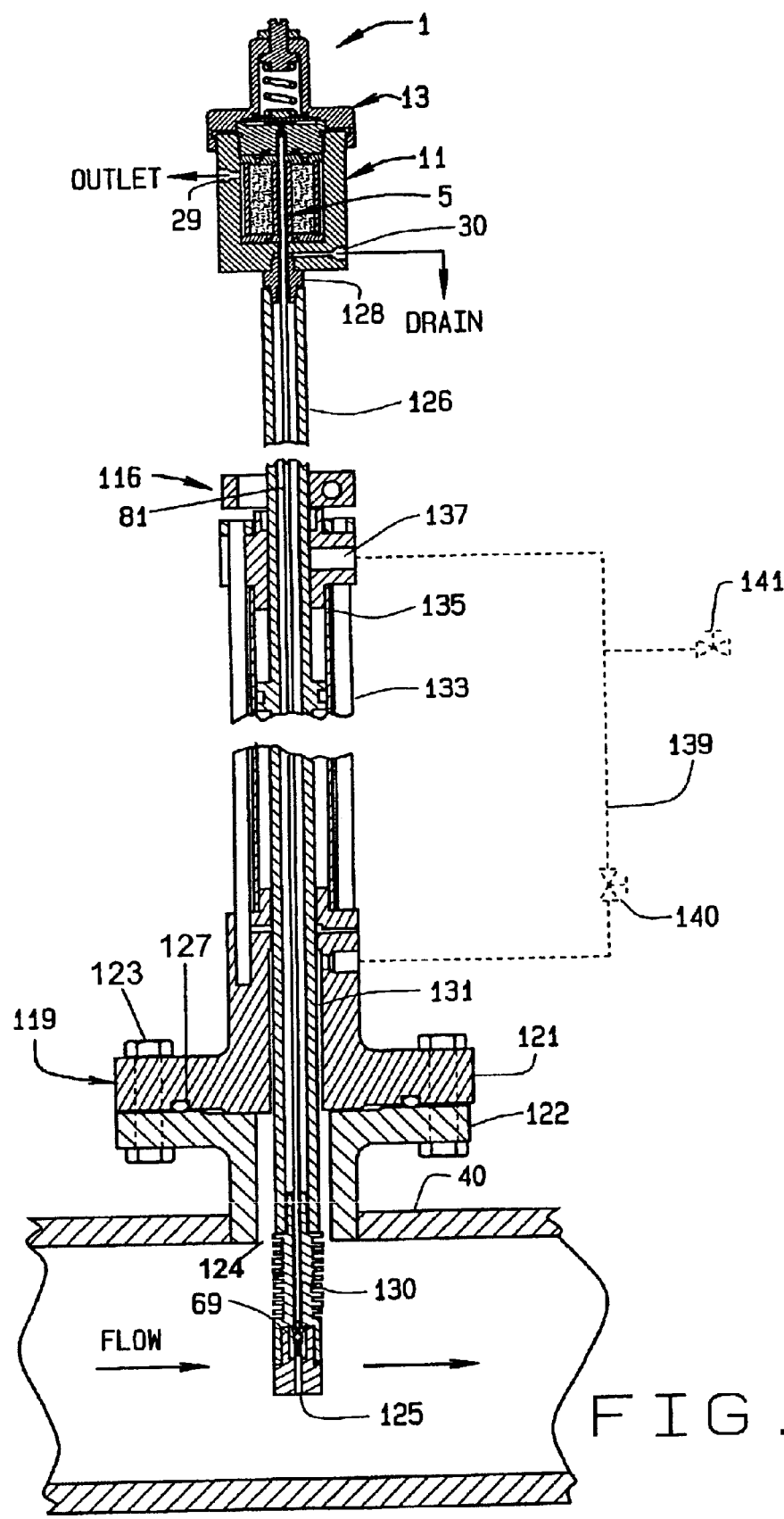
FIG. 4 is a sectional view similar to view FIG. 3, but shows the intake end in an extended position in the flow stream within the conduit.

FIGS. 3 and 4 show a modified form of the invention in which the device 1 is connected to an automatic insertion device, designated generally 116. FIG. 3 illustrates a retracted position and FIG. 4 illustrates an extended position. The automatic insertion device 116 is mounted through a flange and/or screw arrangement as are known in the art. As shown, the mounting is by a coupled flange arrangement 119, comprising a mounting flange 121 secured to a conduit flange 122 as with flange bolts and nuts 123 and sealed to one another as with a seal 127 such as an o-ring in a groove. The flange 122 is secured to the conduit 40 as by welding or threaded engagement as is known in the art. The flange 122 has a through passage 124 for receipt therethrough of a distal end 125 of a carrier 126. The automatic insertion device 116 includes the carrier 126 that is secured to the coupler 128 which in turn is secured to the body 11. The carrier 126 is in the form an elongate hollow rod, receiving therethrough the actuator rod 81. The valve assembly 69 is attached to the carrier 126 by a connector 130. A portion of the carrier 126 and the connector 130 extend through a bore 131 through the flange 121. The automatic insertion device 116 further includes a linear motion drive cylinder, designated generally 133, which may be moved to an extended position as seen in FIG. 4 by pressurizing the cylinder 133 on the back side of a piston 135 through an inlet port 137. The inlet port 137 is connected in flow communication to the conduit 40 via conduit 139 with an infeed flow control valve 140 therein. The conduit 139 is connected to the port 45 which in turn is connected in flow communication with the conduit 40 via the bore 131. By venting the back side of the piston 135 to atmosphere via an exhaust flow control valve 141, the carrier 126 will move to its retracted position from the force applied to the carrier end 125 from the conduit 40. A lock collar 142 is provided to limit the movement of the carrier 126 to an extended position in an adjustable manner and may also be used to lock the carrier 126 in an extended position by securement to the cylinder 133, as is known in the art.

In operation of the devices shown, fluid from the conduit 40 is transferred into the probe 1. The fluid has liquid and/or particulate matter separated therefrom by the separator 5. If liquid is separated, it may be exhausted through the outlet port 30 and the gaseous portion may be exhausted through the outlet port 29 to an instrument, such as a gas chromatograph or the like. The pressure regulator 7 is operable for controlling pressure within the housing 3 under the influence of the springs 64, 87. When it is desired or necessary to change the separator 5, the cap 13 is removed from the body 11. The retainer 73 may then be separated from the body 11 exposing the top wall 93. The actuator rod 81 is preferably separable from either the diaphragm 71 or the valve element 83 to facilitate removal of the separator 5 from the body 11. A new separator may be installed and the actuator rod 81 re-engaged with both the diaphragm 71 and the valve element 83, and the cap 13 reinstalled after installation of the retainer 73.

Thus, there has been shown and described several embodiments of a novel invention. As is evident from the foregoing description, certain aspects of the present invention are not limited by the particular details of the examples illustrated herein and it is therefore contemplated that other modifications and applications, or equivalents thereof, will occur to those skilled in the art. Many changes, modifications, variations and other uses and applications of the present constructions will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A feed stream processing device for use in gathering fluid samples from a first conduit transporting fluid through an interior of the conduit, said device includes:

a housing having a body and a cap removably mounted on the body, said housing includes a coupler for coupling the housing to the first conduit, a flow passage in said housing includes an interior chamber, an inlet communicating with the chamber, a first outlet communicating with the chamber and inlet, and a second outlet communicating with the chamber and the inlet;

a separator element mounted in said chamber forming a permeable barrier in the flow passage flow wise between the inlet and the first outlet, said separator element is operable to separate liquid from the fluid to prevent its flow into the first outlet while permitting the separated liquid to flow to the second outlet for discharge therethrough; and a pressure responsive valve mounted to the housing and positioned in the flow passage flow wise between the inlet and the first outlet and being operable to selectively prevent and permit flow of fluid to the first outlet from the inlet.

2. A device as set forth in claim 1 wherein the valve is a pressure operated valve opening and closing at preset pressures.

3. A device as set forth in claim 1 wherein the separator element includes an outer shell and an inner shell secured to and extending between end members, said inner shell defines a portion of the flow passage directing flow of fluid from the inlet to the separator element for flow through a portion thereof to separate a liquid portion of the fluid from a gas portion of the fluid prior to the gas portion flowing to the first outlet.

4. A device as set forth in claim 1 including an intake member connected to the housing adjacent to the inlet and forming a second flow passage communicating with the inlet to direct flow of fluid from the first conduit to the inlet.

5. A device as set forth in claim 4 wherein the intake has sufficient length to extend into the first conduit interior.

6. A device as set forth in claim 4 includes a drive operably associated with the inlet to selectively move the inlet into and out of the first conduit interior.

7. A device as set forth in claim 4 includes a separate second conduit connected between the coupler and the first conduit.

8. The device as set forth in claim 7 wherein the intake includes a single intake projecting into the interior of the first conduit and opening generally in an upstream direction.

* * * * *